Feb. 16, 1960 J. G. FONTAINE 2,925,279

TELEPHONE ANSWERING RECORDER

Filed Jan. 9, 1956 3 Sheets-Sheet 1

INVENTOR
JOHN G. FONTAINE

Ernest E. Carver
ATTORNEY

Feb. 16, 1960 J. G. FONTAINE 2,925,279

TELEPHONE ANSWERING RECORDER

Filed Jan. 9, 1956 3 Sheets-Sheet 2

INVENTOR
JOHN G. FONTAINE

Ernest E Carver
ATTORNEY

TELEPHONE ANSWERING RECORDER

Filed Jan. 9, 1956 3 Sheets-Sheet 3

INVENTOR
JOHN G. FONTAINE
Ernest F. Carver
ATTORNEY

United States Patent Office 2,925,279

Patented Feb. 16, 1960

2,925,279

TELEPHONE ANSWERING RECORDER

John G. Fontaine, Vancouver, British Columbia, Canada, assignor to Automatic Phone Recorder Co. Ltd., Vancouver, British Columbia, Canada Application January 9, 1956, Serial No. 558,069

3 Claims. (Cl. 274—1)

My invention relates to improvements in telephone answering recorders.

The objects of the invention are to provide means whereby incoming telephone calls may be answered during the absence of the party called, whereby the caller may be informed as to when the party may return or where said party might be contacted.

The device is adapted to be responsive to the bell signal of an outside telephone and is adapted for simple adjustment whereby immediately following the play back of a message recorded thereon the device shall be automatically reset, so as to be able to repeat its message immediately, if necessary.

Further objects are to provide adjustments for setting the message delivery cycle to suit any length of message, and also to provide that any power failure or mechanical defect or breakdown will so disconnect the machine that current flow to the mechanism shall be discontinued or be disrupted until the defect is overcome or repair made.

Referring to the accompanying drawings.

In the drawings like characters of reference indicate corresponding parts in each figure.

Figure 2:
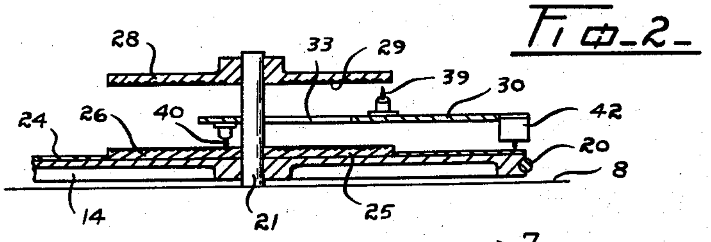
Figure 2 is an enlarged sectional view taken on the line 2—2 of Figure 1.

The numeral 1 indicates a casing having a base 2, a front wall 3 and a rear wall 4. The casing is divided into lower and upper compartments 6 and 7 respectively, by a floor 8. In the lower compartment is an amplifier 10 having a control panel 11, which is displayed on the front wall 3 and a motor 12 for driving a turntable 14 which is rotatably carried in the upper compartment 7. The turntable 14 is driven from the motor 12 by a belt 15 engaging a pulley 16 on a vertical shaft 17, which shaft is fitted with a pulley 19 in the upper compartment 7. The pulley 19 is coupled by a belt 20 to the turntable 14.

Figures 8, 9:
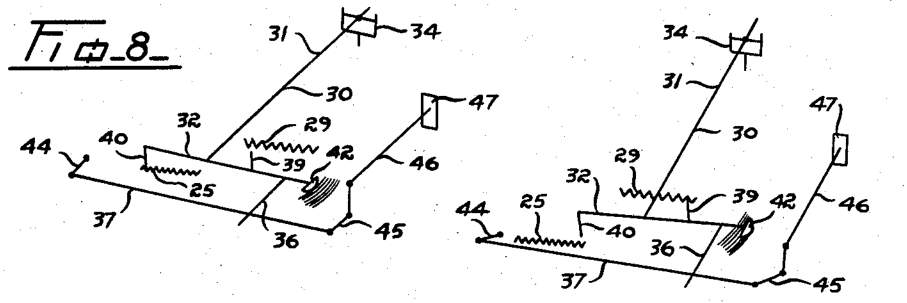
Figures 8 and 9 are diagrammatic views respectively showing the movement of the tone arm to play out and to return to starting point.
Figure 4:
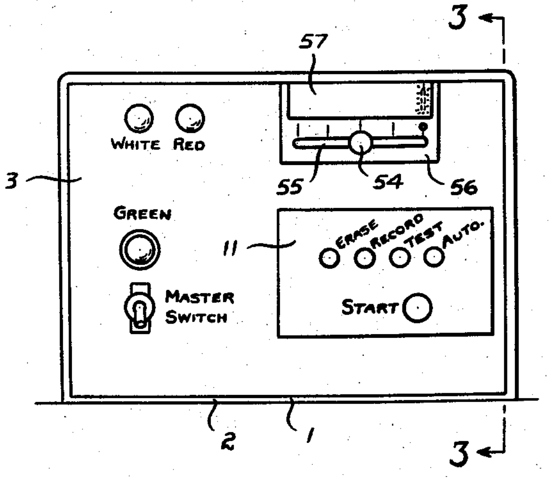
Figure 4 is a front elevational view of the invention.

The turntable 14 is secured upon a vertical shaft 21 which is journalled in a bearing 22 carried by the floor 8 and on the turntable there is a magnet sensitive record disk 24 which occupies the outer annulus of the turntable and a tone arm feed member 25 having a finely incised spiral groove, indicated by the numeral 26, in Figures 8 and 9. Spaced above the record disk 24 and the feed member 25 is a tone arm return disk 28 having on its underside coarse incised spiral grooves 29, see Figures 9 and 10. The tone arm return disk is preferably provided with a three start groove.

Figure 1:
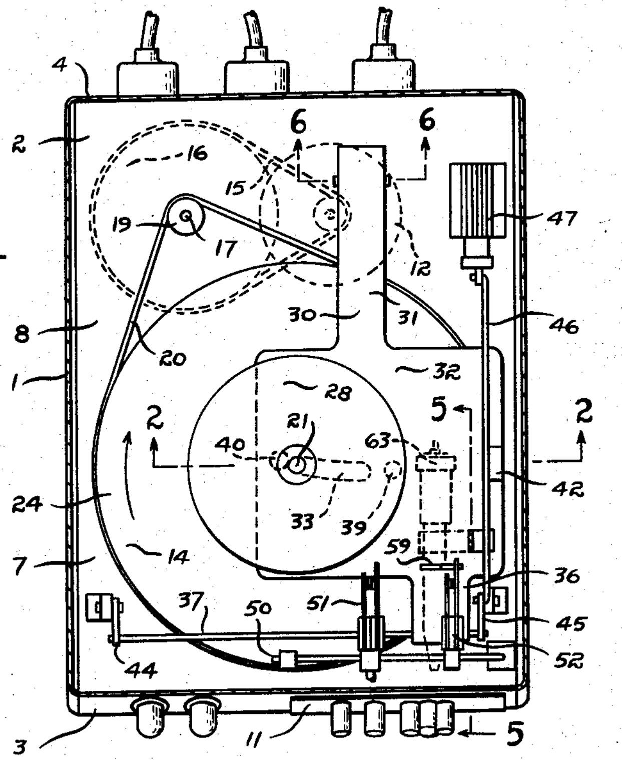
Figure 1 is a plan view of the invention taken on the line 1—1 of Figure 3.

The tone arm, indicated by the numeral 30, is a flat T-shaped member having a stem 31 and head 32, which latter is provided with an arcuate groove 33, shown in dotted line in Figure 1. The stem is mounted upon a universal hinge 34 to enable its head portion to swing both in a horizontal and in a vertical plane, see Figure 6. The free end of the tone arm is provided with an integral extension 36 which is of substantial width which is adapted to be engaged by a horizontal lift bar 37. The extension 36 is of such width as to support the tone arm against lateral tilting when it is raised by the lift bar. An upper guide pin 39 is carried by the head portion 32 of the tone arm 30, which is adapted to engage any of the grooves of the return disk 28, see Figure 2, and a lower guide pin 40 is carried on the underside of the head of the tone arm to engage the groove of the feed member 25. On the underside of the tone arm remote from the pin 40 is a magnetic pickup 42. The lift bar 37 is carried at the free end of two cranks 44 and 45, of which the latter is a bell crank, which is connected by a horizontal rod 46 to a solenoid 47. In "play out" position, the lift bar is down as shown in Figures 1, 3, 5 and 8, leaving the pick up 42 in contact with the record disk 24 and the lower guide pin 40 in the groove of the tone arm feed number 25. When the solenoid 47 is energized the lift bar will raise the tone arm to enable the upper pin 39 to engage one of the grooves of the tone arm return disk 28 to move said tone arm and the magnetic pickup to the right back to starting position.

Figure 5:
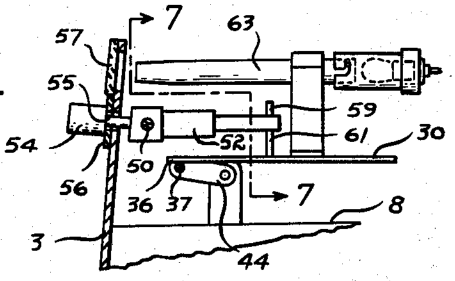
Figure 5 is a detail sectional view taken on the line 5—5 of Figure 1 and showing the tone arm travel limit switches.
Figure 6:
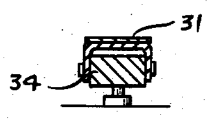
Figure 6 is a detail sectional view of the hinge support for the tone arm, taken on the line 6—6 of Figure 1.
Figure 3:
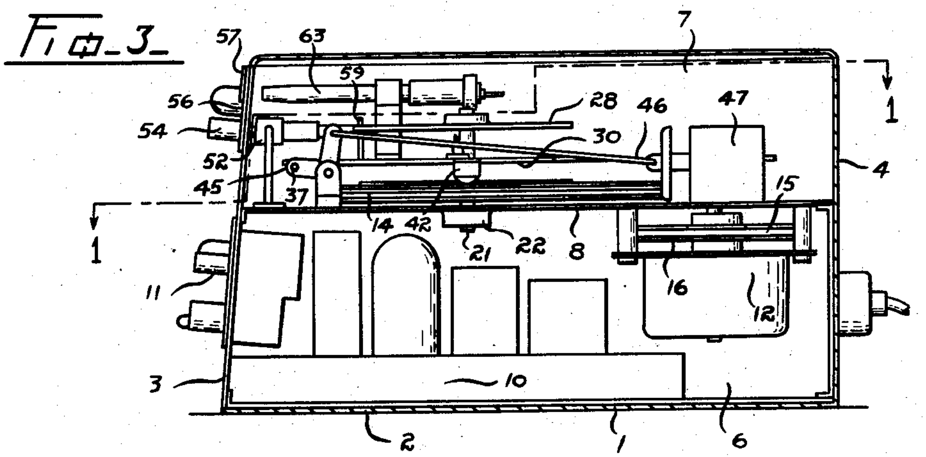
Figure 3 is a longitudinal sectional view taken on the line 3—3 of Figure 4.

A horizontal rail 50 is supported at the rear of the front panel 3, see Figures 1 and 5, upon which two switches 51 and 52 are mounted. The switch 51 is normally open and is slidably movable upon the rail 50 and is provided with a button 54 by which the switch is adjustably set upon said rail. The button is accessible from the front of the machine and travels lengthwise of a slot 55 on a plate 56 having a translucent horizontal strip 57. The switch 52 is normally closed and is fixed as to position. A trip 59 having a vertical edge 60 on its left side and an inclined cam 61 on its right side, is mounted upon the head 32 of the tone arm between the switches 51 and 52. This trip, when the tone arm is lowered as shown in Figure 5 and the pick up is operating to record a message, is adapted to move to left and close the normally open switch 51 by contacting said switch with the left edge 60. When the tone arm is raised and moved to the right the edge 61 of the trip engages the switch 52 to open it and when said tone arm is subsequently lowered onto the member 25 the inclined edge of the trip clears the switch and allows it to close, see Figure 7.

Figure 7:
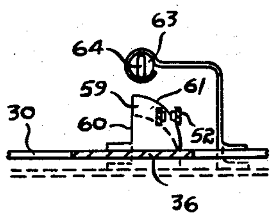
Figure 7 is a detail view taken on the line 7—7 of Figure 5 showing the tone arm raised and the normally closed limit switch open.

An electric torch 63 having a narrow vertical line light opening 64, see Figure 7, is mounted upon the tone arm, which torch is adapted to project a vertical line of light onto the strip 57 and thus indicate on the strip the extent of traverse of the pick-up 42 from starting point or zero.

The front panel is provided with selectively operable push buttons to control the machine to erase a message from the record disk 24, to record from the disk, to test the device to see that it is working satisfactorily and to set the device for automatic operation in response to a signal from an incoming telephone service line. A master switch is provided and indicating lights are disposed to show on the panel 3, all of which are connected as desired to operate the recorder and deliver a recorded message through the amplifier and the service telephone connections coupled to the device. Since most of the electrical connections are standard practice, no special wiring diagram is thought to be necessary in this disclosure.

Figure 10:
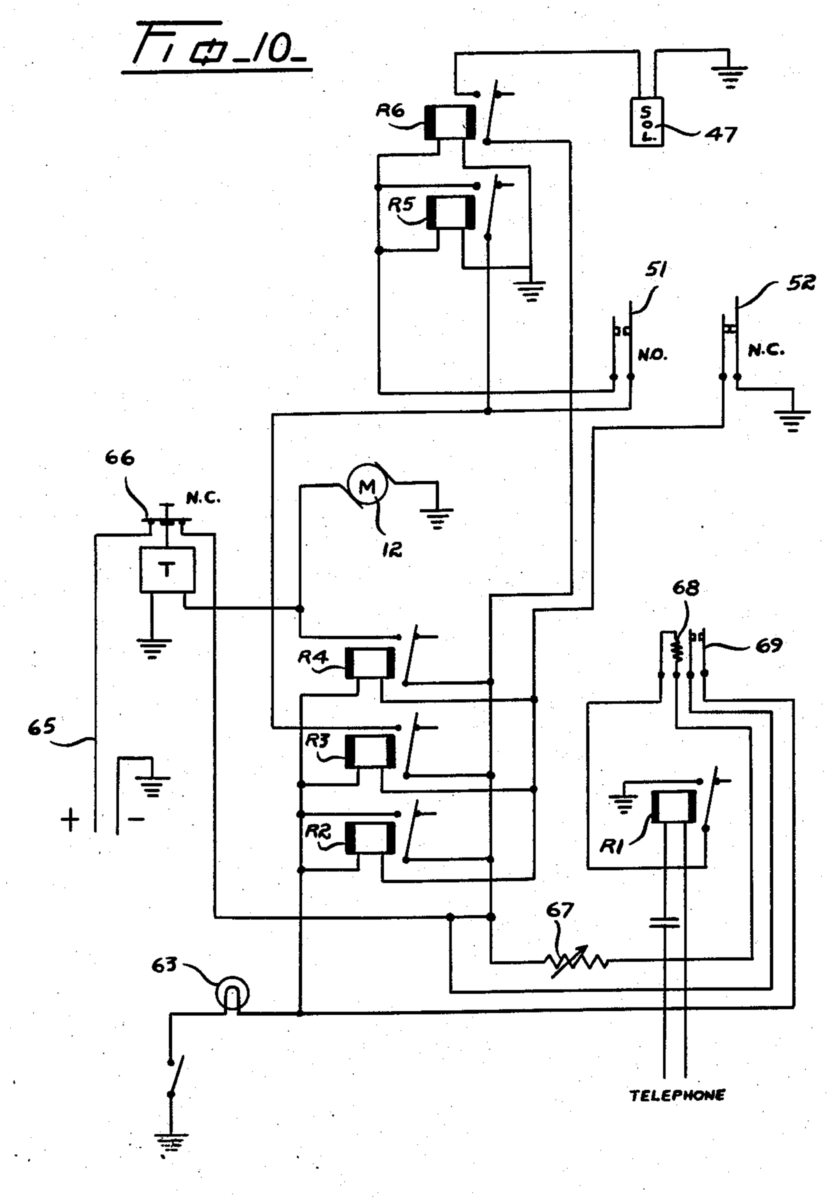
Figure 10 is a wiring diagram showing the circuits controlling the tone arm.

The diagram of Figure 10 is intended to show the circuits actuated primarily from the bell signal on an incoming phone, for starting the recorder motor, providing for the switching on of all relays, thermostats and other devices and for controlling the time traverse of the tone arm, whereby the caller may hear the recorded message.

The incoming signal, normally three spaced A.C. impulses on the telephone service line, energize relay R1, which closes a circuit from the power service line 65 through a manually operated normally closed switch 66, thence through a variable resistance 67 through to a heating element 68 of a thermostatically operated switch 69 and from the heating element through the contact of R1 back to ground.

The relays R2, R3 and R4 are shown as separate items for convenience of description, but would normally consist of one energizing coil with three switch contact structures.

It will be understood that a ringing circuit signal will normally consist of three impulses at short intervals apart, which impulses would each be converted into heat and that the accumulated heat developed in the heating element from said three impulses will be sufficient to cause the switch to close momentarily. The intensity of heat from the element 68 may be increased or decreased, if desired, by manipulation of the variable resistance 67. The momentary closing of the switch 69 energizes the coils of R2—3 and 4, which leaves the contacts of each of them closed and the current flow will continue unbroken through R2 from the line. The current will flow through R3 to the normally open switch 51. The current through R4 will start the motor and will also energize a timer T which is adapted to throw out the normally closed switch 66 after a predetermined delay. Switches 51 and 52 are alternately actuated by the trip 59 as previously described, so that when a message has been played out to the caller the switch 51 is closed, causing relay coils R5 and R6 to be energized. The switch 51 remains closed only momentarily but the coils of the relays 5 and 6 will remain energized directly through the contact of R5, so that R6 will pass current to energize the solenoid 47 to tilt the tone arm and return said tone arm to starting point where switch 52 will be opened by the trip 59. As soon as switch 52 is opened, the solenoid and all relays will be deenergized, thus bringing the device to rest and lowering the tone arm to its original position as shown in Figure 2 and to lower the trip 59 so that its inclined edge 61 will allow switch 52 to return to normally closed position. The timer T is set to throw out the manually operable switch 66 after a predetermined period of current flow therethrough, such period being somewhat longer than the time required for the machine to complete its maximum running cycle, whereby any mechanical breakdown such as a tight bearing or broken belt is prevented from causing any further damage. It will be understood that the present telephone answering recorder will in many instances be installed in an office having a telephone and one or more telephone extensions to one of which the recorder would be connected. Obviously in such circumstances it would be essential that the recorder should not be continuously activated when any incoming telephone call signal is received, so it is necessary that the device can be adjusted to answer the telephone only when sufficient time has been given for one of the other office phones to be picked up for answering by an office member. As an example, it may be assumed that the regular office staff would answer any telephone on the first or second bell signal ring, therefore it would be desirable that the variable resistance 67 be adjusted so that the thermostatically controlled switch 69 would not close until the third ring. Since it is possible to adjust the device to function at any desired period of delay from the first call impulse the device could be left on automatic at all times, but it would not function until a predetermined time lapse during which an office member could normally answer the phone manually. It will be apparent that when the phone is used for outgoing calls no impulse will affect the recorder.

When it is desired to set the device to answer telephone calls, the master switch on the front panel is tripped and the automatic button is pressed. This movement connects the amplifier 10 to the magnetic recorder mechanism and the wiring system generally with a telephone. The wiring is such that the recorder can be used to receive or play out a message from the owner of the telephone through the usual telephone circuit and also to permit said message to be removed from the disk 24 and another placed thereon at will. When the device is set to "Automatic" and the master switch is set to operate, an incoming message will set the mechanism in operation as before described and cause the recorded message on the record to be played back through to the caller, which message may reasonably be to the effect that the party called could be found at a stated office. The normal circuits of the device other than those illustrated in Figure 10 would transmit the message being played out by phone to the caller, would make it possible to set the device to erase a transcribed message and transcribe a new message on the magnetic disk 24.

The torch 63 is connected up to the electric supply line to enable a light line to traverse the translucent strip 57.

The button 54 attached to the switch 51 may be adjusted to cause said switch to be closed immediately following the play back of a message, so that no time may be lost in the device responding to another ringing impulse.

It will be noticed that at all times when the tone arm is in playing position, that the guide pin 40 is riding in a groove of the feed member 25, the pickup 42 is riding on the record disk 24, and the extension 36 of the tone arm is riding above the lift bar 37, consequently the tone arm must necessarily remain absolutely parallel with the record disk, thus ensuring a truer tone than that normally obtained.

The slot 33 in the tone arm which embraces the shaft 21 serves as a limit stop for said tone arm and prevents the pickup 42 or the guide pins 39 and 40 from moving beyond their appointed range.

The telephone circuit will be so connected to the power line that as soon as a calling party hangs up his receiver, the recording functions of the device will be disconnected and by throwing out the master switch the device may be used for any ordinary dictation or recording service that may be required.

What I claim as my invention is:

1. A disk recorder having a turntable, a tone arm and a pick-up, a feed member rotatable with the turntable having on its face a spiral groove similar to the sound track of a record on said turntable, said member being engageable by a pin on the tone arm to move the pick-up in playing direction, a disk rotatable with the turntable having a spiral groove on a face thereof, and a second pin on the tone arm adapted to engage said disk and move the disk in a return direction, electrical circuits including a solenoid and a switch adjacent the end of a play out run of the tone arm, said switch being adapted to energize the solenoid and move the tone arm to cause one pin to disconnect from the groove of the feed member and to cause the second pin to engage the groove of the disk to return the tone arm to starting position.

2. A disk recorder as claimed in claim 1, said tone arm being adapted when nearing the end of its return stroke to break the circuits and to place them in condition to be reinstated for further recording.

3. A disk recorder having a turntable, a tone arm and a pick-up, said turntable being mounted upon a rotatable shaft, means for rotating the shaft in one direction, said turntable having a record disk and an annular area adjacent said record disk, said annular area having a planetary spiral thread, a disk having a spiral thread on one face secured upon the shaft, said tone arm having a pin adapted to engage the first-named spiral thread and cause the tone arm to move in one direction and a second pin adapted to engage the spiral thread of the disk to cause the tone arm to move in an opposite direction, and means for initiating the return movement of the tone arm at any part of its feed movement, said return initiating means comprising a switch adjustable as to position relative to the normal swing of the tone arm and a circuit in which said switch is included for moving the tone arm to disengage one pin from its thread and to cause the engagement of the second pin with the second named thread.

References Cited in the file of this patent

UNITED STATES PATENTS

| | | |
|---|---|---|
| 946,563 | Rhodes | Jan. 18, 1910 |
| 1,104,760 | Abraham | July 28, 1914 |
| 1,249,251 | Turnquist | Dec. 4, 1917 |
| 1,438,000 | Underhill | Dec. 5, 1922 |
| 2,340,366 | Cesareo | Feb. 1, 1944 |
| 2,394,539 | Erwood et al. | Feb. 12, 1946 |
| 2,562,665 | Grimm | July 31, 1951 |
| 2,567,092 | Williams | Sept. 4, 1951 |
| 2,777,898 | Shively | Jan. 15, 1957 |
| 2,802,059 | Spack | Aug. 6, 1957 |